April 6, 1937.  W. DÄLLENBACH  2,076,335
SELECTING DEVICE
Filed Dec. 29, 1933
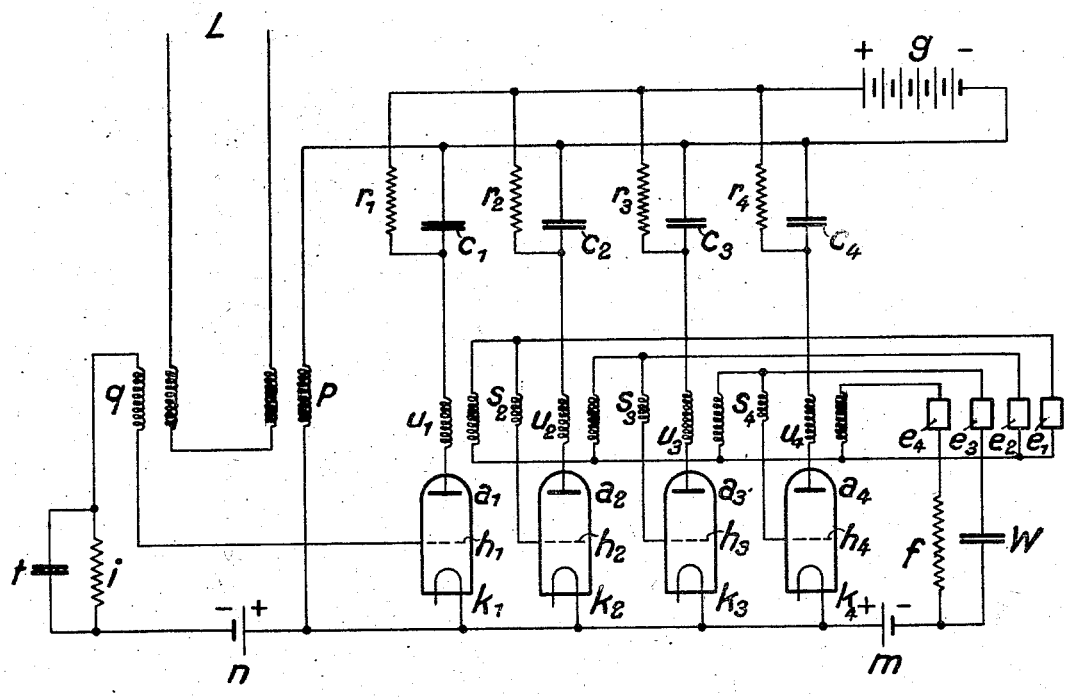
Inventor:
Walter Dällenbach
By Marks & Clerk Patented Apr. 6, 1937

2,076,335

UNITED STATES PATENT OFFICE 2,076,335

SELECTING DEVICE

Walter Dällenbach, Berlin-Charlottenburg, Germany, assignor to N. V. Machinerieen-en apparaten Fabrieken "Meaf", Utrecht, Netherlands Application December 29, 1933, Serial No. 704,566
In Germany January 3, 1933

5 Claims. (Cl. 178—53.1)

This invention relates to a device for selecting receivers over a common connecting line.

The invention represents an electric analogy to the start-stop principle used in the communication art for synchronizing transmitters and receivers as, for instance, in telegraphs, whereby synchronized alternating current networks at the transmitting and receiving points are saved.

By way of example, the invention is illustrated in the accompanying drawing.

Referring to the drawing, a battery $g$ charges over the resistances $r_1$, $r_2$, $r_3$, $r_4$ the condensers $c_1$, $c_2$, $c_3$, $c_4$ connected in series with the transformers $u_1$, $u_2$, $u_3$, $u_4$ and the valves provided with the control grids $h_1$, $h_2$, $h_3$, $h_4$, the anodes $a_1$, $a_2$, $a_3$, $a_4$ and the hot cathodes $k_1$, $k_2$, $k_3$, $k_4$. The valves are gas-filled, so that, when the blocking ceases even for a short period, the control valve will retain its conductivity until the current has reached zero. The ends of the secondary windings of the transformers $u_1$, $u_2$, $u_3$, $u_4$ are connected with the receivers $e_1$, $e_2$, $e_3$, $e_4$. One end of the secondary winding of the transformers is connected over a choking coil or throttle $S_2$, $S_3$, $S_4$, with the control grid of the following tube.

The grid $h_1$ of the first valve cell is negatively biased by the battery $n$ and the resistance $i$.

L represents the line coming from the transformer (not shown) which line is adapted to transmit high frequency impulses.

Condensers $w$ and $t$ are connected in parallel to the grid resistances $f$ and $i$, in order to create a convenient path for the alternating currents.

The sender may consist of any desired device which is adapted to send out high frequency impulses along conductor L at certain successive time intervals.

The device operates as follows:

It is assumed at the outset that conductor L receives only synchronization impulses, and no signal impulses. This synchronization high frequency impulse sent out from the sender is transmitted through the transformer $q$ to the grid $h_1$ of the first valve-tube and neutralizes, although only temporarily, the negative charge of the grid $h_1$. This renders the gas path $a_1$—$k_1$ conductive, and closes a discharge circuit for the condenser $c_1$ through $u_1$, $a_1$, $k_1$, $p$. The discharge current of condenser $c_1$, which first rises and then falls, induces a low frequency voltage impulse in the secondary winding of transformer $u_1$, which leaves the high frequency receiver unaffected, but which acts on the grid $h_2$ of the second valve-tube back to the secondary winding of $u_1$ by way of $s_2$, $h_2$, $k_2$, $f$—$w$.

As long as the discharge current of condenser $c_2$ increases, the negative charge of grid $h_2$, and therefore the stopping action, is increased. As soon as the discharge current of condenser $c_1$ begins to fade away, the direction of the electromotive force at the secondary winding of the transformer $u_1$ changes and the grid $h_2$ becomes positive. At the same time, the non-conducting gas path $a_2$—$k_2$ becomes conductive, while the gas path $a_1$—$k_1$ is rendered non-conductive as a result of the termination of the discharging of condenser $c_1$.

In similar manner, conductor $c_2$ now begins to discharge and, shortly before this terminates, it starts the discharge of condenser $c_3$ which, in turn, starts the discharge of condenser $c_4$. It is clear that this principle of successive discharging of condensers may be extended to include any desired number. After the last condenser has discharged, the distributor is stopped until it is started again by the application of another synchronizing impulse to conductor L.

The sequence of discharge operations described above thus causes one of the parallel circuits $c_1$, $u_1$, $a_1$, $k_1$, $c_2$, $u_2$, $a_2$, $k_2$, etc. to become conductive from time to time, whereby it is accessible to the high frequency currents which are impressed on the conductor L between two synchronizing impulses, and which pass through the transformer $p$. Accordingly, by sending a signal impulse over conductor L from the high frequency impulse which starts the discharge of the condenser $c_1$, it becomes possible by suitable time intervals to cause said signal impulse to act selectively through condensers $c_1$, $c_2$, $c_3$, $c_4$ on transformers $u_1$, $u_2$, $u_3$, $u_4$ and thus on receivers $e_1$, $e_2$, $e_3$, $e_4$.

Assume, for example, that while condenser $c_3$ is discharging, high frequency impulses, for example, in telegraphic rhythm, are impressed upon conductor L. These high frequency impulses are transmitted through transformer $p$ to the circuit $p$, $c_3$, $u_3$, $a_3$, $k_3$, $p$, and through transformer $u_3$ to the high frequency receiver connected to the secondary winding thereof. The high frequency choking coil or throttle $S_4$ prevents the high frequency from acting or being impressed on grid $h_4$ of the next tube. Accordingly, the discharge current of the condenser $c_3$ is in the primary and secondary winding of transformer $u_3$, and also the high frequency impressed onto the conductor L during the discharge of this condenser, said current and frequency being superimposed on each other. The choking coil or throttle $S_4$ effects a separation in that only the discharge current affects the grid potential of the folowing valve tube, while the high frequency is taken up in the high frequency receiver $e_3$.

The duration of the individual discharges must be balanced by the size of the condensers, load resistances and discharge lines in such manner that the total duration of the discharge impulse arising in the parallel conductor channels is smaller than the period of synchronizing impulse of the sender.

Actuating can take place by wireless instead of through the line L.

I claim:—

1. A distributor for selectively distributing signals received over a common connecting line comprising a plurality of normally non-conducting channels, a coupling transformer connecting said chanels in parallel with the connecting line, each channel consisting of a condenser for the signal impulses and a grid-controlled discharge tube, means responsive to an initial impulse received over said connecting line for initiating operation of the grid controlled discharge tube in the first channel whereby said channel becomes conductive, and means responsive thereto for rendering the remaining channels successively conductive.

2. A distributor for selectively distributing signals received over a common connecting line, comprising a plurality of normally non-conducting channels, a coupling transformer connecting said channels in parallel with the connecting line, each channel including a condenser for the signal impulses, a grid-controlled discharge tube, and a high ohmic resistance, a common source of potential for charging said condensers over the resistances, means responsive to an initial impulse received over said connecting line for initiating operation of the grid controlled discharge tube in the first channel, said discharge tubes being adapted to discharge the condensers, transformers, the primary coil of the transformers in series with the discharge channels, receivers, each secondary coil of said transformers being connected with a receiver.

3. A distributor for selectively distributing signals received over a common connecting line comprising a plurality of normally non-conducting channels, a coupling transformer connecting said channels in parallel with the connecting line, each channel consisting of a condenser for the signal impulses, a grid-controlled discharge tube, and a high ohmic resistance, a common potential source for charging said condensers over the resistances, transformers, the primary coil of each transformer being in series with a discharge channel, receivers, each secondary coil of said last-named transformers being connected with a receiver, potential sources imparting a negative preliminary potential to said grids, said coupling transformer passing the initial impulse to the grid of the first tube, the secondary coils of said coupling transformer inducing potentials and nullifying the negative preliminary potential of the following tube grids of the series.

4. In a distributor as claimed in claim 3, choking coils in the second and each following grid line.

5. In a distributor as claimed in claim 3, choking coils in the second and each following grid line, each of said control grids being connected with the secondary winding of the preceding transformer.

WALTER DÄLLENBACH.